US012561427B2

(12) United States Patent
Rodriguez

(10) Patent No.: US 12,561,427 B2
(45) Date of Patent: Feb. 24, 2026

(54) METHODS AND SYSTEMS FOR ENHANCING DETECTION OF MULTIMEDIA DATA GENERATED USING ARTIFICIAL INTELLIGENCE

(71) Applicant: Daon Technology, Douglas (IM)

(72) Inventor: Raphael A. Rodriguez, Marco Island, FL (US)

(73) Assignee: Daon Technology, Douglas (IM)

( * ) Notice: Subject to any disclaimer, the term of this patent is extended or adjusted under 35 U.S.C. 154(b) by 0 days.

(21) Appl. No.: 18/542,339

(22) Filed: Dec. 15, 2023

(65) Prior Publication Data

US 2025/0200173 A1 Jun. 19, 2025

(51) Int. Cl.
*G06F 21/55* (2013.01)
*G06V 40/16* (2022.01)
*G06V 40/40* (2022.01)
*G10L 17/18* (2013.01)

(52) U.S. Cl.
CPC ...... *G06F 21/552* (2013.01); *G06F 2221/034* (2013.01); *G06V 40/161* (2022.01); *G06V 40/40* (2022.01); *G10L 17/18* (2013.01)

(58) Field of Classification Search
None
See application file for complete search history.

(56) References Cited

U.S. PATENT DOCUMENTS 11,188,798 B1 * 11/2021 Goswami ............ G06F 18/2413
11,368,289 B1 * 6/2022 Kvochko .............. G06V 20/46

| | | | | |
|---|---|---|---|---|
| 2002/0052885 A1 * | 5/2002 | Levy | ................. | G06F 16/10 |
| 2018/0288362 A1 * | 10/2018 | Altenburger | ......... | H04N 9/8205 |
| 2019/0138830 A1 * | 5/2019 | Justice | .................. | G06V 10/82 |
| 2020/0244639 A1 * | 7/2020 | Arif Khan | ........... | G06N 3/0499 |
| 2020/0267404 A1 * | 8/2020 | Levy | ................. | H04L 9/3239 |
| 2021/0117690 A1 * | 4/2021 | Ye | ................. | G06V 40/176 |
| 2021/0224596 A1 * | 7/2021 | McDevitt | ............... | G06N 5/046 |
| 2021/0233541 A1 * | 7/2021 | Chen | ................. | G10L 17/22 |
| 2021/0319240 A1 * | 10/2021 | Demir | .................. | G06N 3/044 |

(Continued)

OTHER PUBLICATIONS

Hong K, Du X. Self-Supervised Deepfake Detection by Discovering Artifact Discrepancies. InCEUR Workshop Proceedings 2021. (Year: 2021).*

(Continued)

*Primary Examiner* — James R Turchen
(74) *Attorney, Agent, or Firm* — Kevin McDermott, Esq.

(57) ABSTRACT

A method for enhancing detection of multimedia data generated using artificial intelligence is provided that includes the step of receiving, by an electronic device operated by a user, multimedia data. The multimedia data includes at least one of one or more images and voice data. Moreover, the method includes the step of analyzing, using a trained machine learning model, the one or more images for artifacts indicating the use of artificial intelligence in generating the one or more images, and determining, using a synthetic speech detection algorithm, whether the voice data includes artifacts indicating the use of artificial intelligence in generating the voice data. In response to determining the one or more images includes at least one artifact or the voice data includes at least one artifact, the multimedia data is determined to be fraudulent and originating from artificial intelligence generation.

16 Claims, 5 Drawing Sheets

(56) References Cited

U.S. PATENT DOCUMENTS

| | | | | |
|---|---|---|---|---|
| 2022/0053123 | A1* | 2/2022 | Wannamaker | H04N 21/23476 |
| 2022/0058375 | A1* | 2/2022 | Kwon | G06T 7/0002 |
| 2022/0121868 | A1* | 4/2022 | Chen | G10L 17/22 |
| 2022/0138472 | A1* | 5/2022 | Mittal | G06N 3/048 |
| | | | | 382/181 |
| 2022/0156897 | A1* | 5/2022 | Jeong | G06V 10/82 |
| 2022/0375259 | A1* | 11/2022 | Banerjee | G06V 40/45 |
| 2022/0383481 | A1* | 12/2022 | Kim | G06N 3/045 |
| 2022/0399024 | A1* | 12/2022 | Siyavudeen | G10L 15/01 |
| 2023/0021661 | A1* | 1/2023 | Bao | G06V 10/26 |
| 2023/0099619 | A1* | 3/2023 | Howald | H04L 63/08 |
| | | | | 726/3 |
| 2023/0114980 | A1* | 4/2023 | Gupta | G06V 40/167 |
| | | | | 382/118 |
| 2023/0195862 | A1* | 6/2023 | Einstein | G06F 21/32 |
| | | | | 726/2 |
| 2023/0274758 | A1* | 8/2023 | Markhasin | G10L 21/0308 |
| | | | | 704/232 |
| 2023/0298332 | A1* | 9/2023 | Kim | G06V 10/94 |
| | | | | 382/157 |
| 2023/0343342 | A1* | 10/2023 | Traynor | G10L 17/06 |
| 2023/0396428 | A1* | 12/2023 | Gunn | H04L 9/3231 |
| 2023/0410505 | A1* | 12/2023 | Sinha | G06V 10/82 |
| 2024/0005360 | A1* | 1/2024 | Garthwaite | G06F 16/44 |
| 2024/0070457 | A1* | 2/2024 | Charnock | G06N 3/04 |
| 2024/0127825 | A1* | 4/2024 | Carroll | G10L 17/22 |

OTHER PUBLICATIONS

Liu X, Liu M, Zhang L, Zhang L, Zeng C, Li K, Li N, Lee KA, Wang L, Dang J. Deep spectro-temporal artifacts for detecting synthesized speech. InProceedings of the 1st International Workshop on Deepfake Detection for Audio Multimedia Oct. 14, 2022 (pp. 69-75). (Year: 2022).*

Jaleel Q, Hadi I. Facial Action Unit-Based Deepfake Video Detection Using Deep Learning. In2022 4th International Conference on Current Research in Engineering and Science Applications (ICCRESA) Dec. 20, 2022 (pp. 228-233). IEEE. (Year: 2022).*

Liang P, Liu G, Xiong Z, Fan H, Zhu H, Zhang X. A facial geometry based detection model for face manipulation using CNN-LSTM architecture. Information Sciences. Jul. 1, 2023;633:370-83. (Year: 2023).*

Li M, Liu B, Hu Y, Zhang L, Wang S. Deepfake detection using robust spatial and temporal features from facial landmarks. In2021 IEEE International Workshop on Biometrics and Forensics (IWBF) May 6, 2021 (pp. 1-6). IEEE. (Year: 2021).*

Stanciu DC, Ionescu B. Deepfake video detection with facial features and long-short term memory deep networks. In2021 International Symposium on Signals, Circuits and Systems (ISSCS) Jul. 15, 2021 (pp. 1-4). IEEE. (Year: 2021).*

Yi J, Wang C, Tao J, Zhang X, Zhang CY, Zhao Y. Audio deepfake detection: A survey. arXiv preprint arXiv:2308.14970. Aug. 29, 2023. (Year: 2023).*

* cited by examiner

100

METHODS AND SYSTEMS FOR ENHANCING DETECTION OF MULTIMEDIA DATA GENERATED USING ARTIFICIAL INTELLIGENCE

BACKGROUND OF THE INVENTION

This invention relates generally to multimedia content, and more particularly, to methods and systems for enhancing detection of multimedia data generated using artificial intelligence.

Individuals conduct transactions with many different service providers in person and remotely over the Internet. Network-based transactions conducted over the Internet may involve, for example, opening a bank account or similar account using a website or mobile application. Service providers typically require successfully identifying an individual before he or she is permitted to open a bank account or conduct any other type of network-based transaction.

Service providers typically require individuals to upload an image of his or her identity document, like a driver's license or a passport, and a claim of identity to facilitate authentication. The uploaded images are typically analyzed to determine whether the identity document in the uploaded image is authentic, jurisdictionally accurate, and unexpired.

It is known that fraudulent identity documents may be created by weaving together real and fake identity document elements. Images of fraudulent identity documents can be uploaded, for example, when remotely attempting to open a bank account. Such impersonations are known as spoofing. These fraudulent identity documents may be of such high quality that it is almost impossible to distinguish them from genuine identity documents using known techniques. As a result, if not detected such fraudulent identity documents may be used, for example, to steel money from bank and stock accounts, steel healthcare records, and facilitate insurance fraud. Thus, these fraudulent identity documents pose a significant risk to network-based transactions conducted between individuals and, for example, banks, insurance companies, healthcare companies, and fintech companies.

Consequently, authenticating an individual desiring to conduct a network-based transaction using an uploaded image of an identity document captured at a remote location may depend on distinguishing between a genuine image or voice and one that has been artfully manipulated.

Known methods for determining the authenticity of an identity document included in an image may analyze various features of the document, for example, the text font, presence of security features, and color spectrum, and may verify the uploaded image was not taken of a photocopy. However, known methods of analyzing identity documents typically fail to detect such high-quality fraudulent identity documents.

Thus, it would be advantageous and an improvement over the relevant technology to provide a method and a system capable of enhancing detection of multimedia data generated using artificial intelligence, enhancing security against spoofing attacks, and facilitating a reduction in costs incurred due to successful spoofing attacks.

BRIEF DESCRIPTION OF THE INVENTION

An aspect of the present disclosure provides a method for enhancing detection of multimedia data generated using artificial intelligence. The method includes the step of receiving, by an electronic device operated by a user, multimedia data. The multimedia data includes at least one of one or more images and voice data. Moreover, the method includes the step of analyzing, using a trained machine learning model, the one or more images for artifacts indicating the use of artificial intelligence in generating the one or more images, and determining, using a synthetic speech detection algorithm, whether the voice data includes artifacts indicating the use of artificial intelligence in generating the voice data. In response to determining the one or more images includes at least one artifact or the voice data includes at least one artifact, the multimedia data is determined to be fraudulent and originating from artificial intelligence generation.

In one embodiment of the present disclosure the method includes displaying a message that indicates the multimedia data is fraudulent and prompts the user to cease viewing the multimedia data.

In another embodiment of the present disclosure the method includes determining the multimedia data is authentic in response to determining the one or more images and the voice data are devoid of artifacts.

In yet another embodiment of the present disclosure the method includes extracting features from the voice data, and analyzing the extracted features using a trained machine learning model to determine whether the voice data includes artifacts indicating the use of artificial intelligence in generating the voice data.

In another embodiment of the present disclosure the method includes analyzing behavioral biometrics of the user to detect anomalies indicative of cyber-attacks generated by artificial intelligence. Behavioral biometrics include interactions with the electronic device and user movements associated with the use of devices operatively connected to the electronic device.

In another embodiment of the present disclosure wherein the devices operatively connected to the electronic device comprise a keyboard and a mouse.

In yet another embodiment of the present disclosure the multimedia data includes a video including frames and each frame includes an image of the face of the user. The method further includes the steps of identifying the position of facial landmarks in each frame and monitoring the position of each facial landmark between frames to assess the presence of unnatural movements or visual abnormalities indicting the use of artificial intelligence in generating the video.

In another embodiment of the present disclosure the image includes the face of the user and the method further includes extracting features from an image included in the one or more images. The extracted features include facial landmarks, facial expressions, pixel density, orientation of the face within the image, color saturation, the spatial gap between a device that captured the image and the user, and ambient lighting conditions. Moreover, the method includes analyzing the extracted features to determine whether the image includes artifacts indicating the use of artificial intelligence in generating the image.

In another embodiment of the present disclosure the method includes assessing linguistic patterns and audio anomalies in the voice data.

In another embodiment of the present disclosure the multimedia data includes a video and the method includes generating a cryptographic hash for each frame of the video based on the image in the respective frame, and generating a cryptographic hash for each frame of the video based on the audio data in the respective frame.

Another aspect of the present disclosure provides an electronic device for enhancing detection of multimedia data generated using artificial intelligence including a processor and a memory configured to store data. The electronic device is associated with a network and the memory is in communication with the processor and has instructions stored thereon which, when read and executed by the processor, cause the electronic device to receive multimedia data that includes at least one of one or more images and voice data and analyze, using a trained machine learning model, the one or more images for artifacts indicating the use of artificial intelligence in generating the one or more images.

Moreover, the instructions when read and executed by the processor, further cause the electronic device to determine, using a synthetic speech detection algorithm, whether the voice data includes artifacts indicating the use of artificial intelligence in generating the voice data. In response to determining the one or more images includes at least one artifact or the voice data includes at least one artifact, the instructions when read and executed by the processor, further cause the electronic device to determine the multimedia data is fraudulent and originating from artificial intelligence generation.

In an embodiment of the present disclosure, the instructions when read and executed by the processor, further cause the electronic device to display a message that indicates the multimedia data is fraudulent and prompts the user to cease viewing the multimedia data.

In an embodiment of the present disclosure, the instructions when read and executed by the processor, further cause the electronic device to determine the multimedia data is authentic in response to determining the one or more images and the voice data are devoid of artifacts.

In an embodiment of the present disclosure, the instructions when read and executed by the processor, further cause the electronic device to extract features from the voice data and analyze the extracted features using a trained machine learning model to determine whether the voice data includes artifacts indicating the use of artificial intelligence in generating the voice data.

In an embodiment of the present disclosure, the instructions when read and executed by the processor, further cause the electronic device to analyze behavioral biometrics of the user to detect anomalies indicative of cyber-attacks generated by artificial intelligence. Behavioral biometrics include interactions with the electronic device and user movements associated with the use of devices operatively connected to the electronic device.

In an embodiment of the present disclosure, the devices operatively connected to the electronic device include a keyboard and a mouse.

In an embodiment of the present disclosure, the multimedia data includes a video including frames and each frame includes an image of the face of the user, wherein the instructions when read and executed by the processor, further cause the electronic device to identify the position of facial landmarks in each frame and monitor the position of each facial landmark between frames to assess the presence of unnatural movements or visual abnormalities indicating the use of artificial intelligence in generating the video.

In an embodiment of the present disclosure, wherein the image is of the face of the user and the instructions when read and executed by the processor, further cause the electronic device to extract features from an image in the one or more images. The extracted features include facial landmarks, facial expressions, pixel density, orientation of the face within the image, color saturation, the spatial gap between a device that captured the image and the user, and ambient lighting conditions. Moreover, the instructions when read and executed by the processor, further cause the electronic device to analyze the extracted features to determine whether the image includes artifacts indicating the use of artificial intelligence in generating the image.

In an embodiment of the present disclosure, the instructions when read and executed by the processor, further cause the electronic device to assess linguistic patterns and audio anomalies in the voice data.

In an embodiment of the present disclosure, the instructions when read and executed by the processor, further cause the electronic device to generate a cryptographic hash for each frame of the video based on the image in the respective frame and generate a cryptographic hash for each frame of the video based on the audio data in the respective frame.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
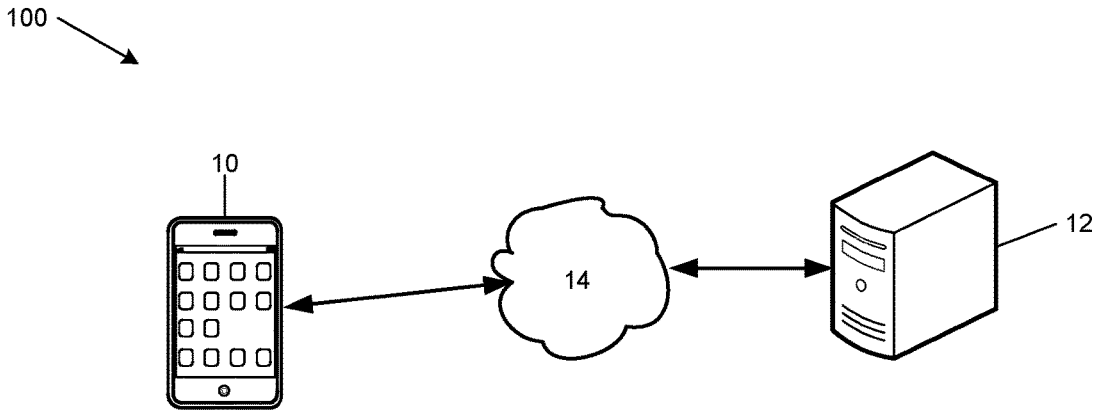
FIG. 1 is a schematic diagram of an example computing system for enhancing detection of multimedia data generated using artificial intelligence according to an embodiment of the present disclosure.

FIG. 1 is a schematic diagram of an example computing system 100 for enhancing detection of multimedia data generated using artificial intelligence according to an embodiment of the present disclosure. As shown in FIG. 1, the main elements of the system 100 include an electronic device 10 and a server 12 communicatively connected via a network 14.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device included in the system 100. Moreover, the electronic device 10 may alternatively be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC).

The electronic device 10 may be associated with a single person who operates the device. The person who is associated with and operates the electronic device 10 is referred to herein as a user.

The server 12 can be, for example, any type of server or computer implemented as a network server or network computer. The electronic device 10 and server 12 may alternatively be referred to as information systems. The server 12 may also alternatively be referred to as an electronic device.

The network 14 may be implemented as a 5G communications network. Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

It is contemplated by the present disclosure that the number of electronic devices 10 and servers 12 is not limited to the number shown in the system 100. Rather, any number of electronic devices 10 and servers 12 may be included in the system 100.

Figure 2:
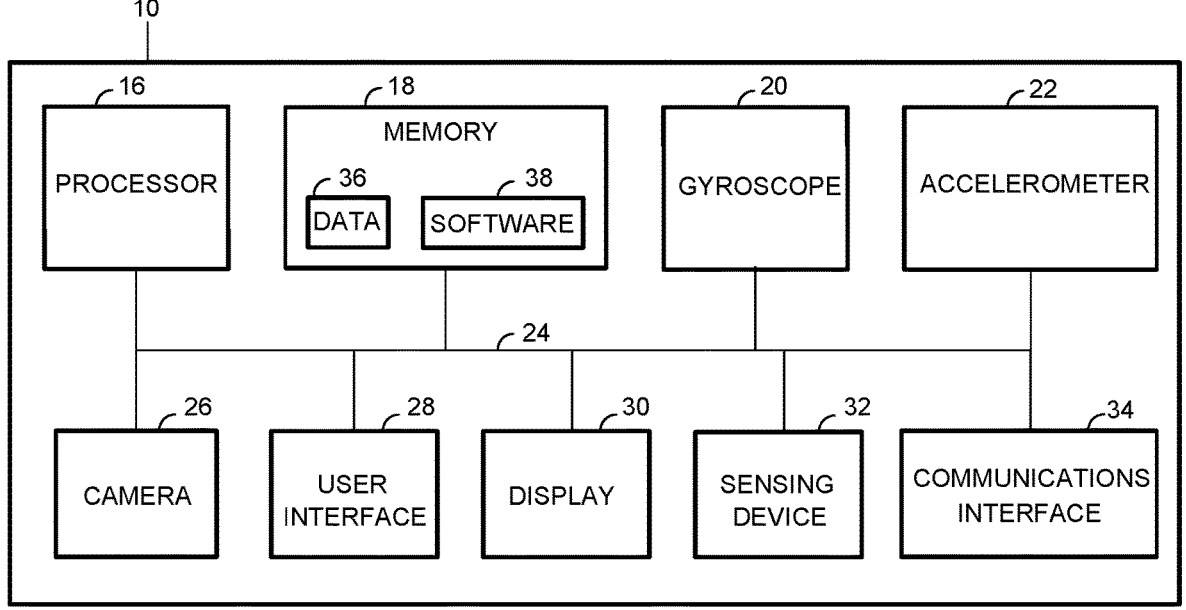
FIG. 2 is a more detailed schematic diagram illustrating an example electronic device in the system of FIG. 1.

FIG. 2 is a more detailed schematic diagram illustrating the example electronic device 10 used for enhancing detection of multimedia data generated using artificial intelligence according to an embodiment of the present disclosure. The electronic device 10 includes components such as, but not limited to, one or more processors 16, a memory 18, a gyroscope 20, one or more accelerometers 22, a bus 24, a camera 26, a user interface 28, a display 30, a sensing device 32 and a communications interface 34. General communication between the components in the electronic device 10 is provided via the bus 24.

In FIG. 2, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that capable of communicating with the electronic device 10. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC). It is contemplated by the present disclosure that the electronic device 10 may not include some components, for example, the gyroscope 20 and accelerometer 22 in some embodiments.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 18 may be used to store any type of data 36, for example, data records of users and multimedia data. Each data record is typically for a respective user. The data record for each user may include data such as, but not limited to, the name of the user, images of identity documents associated with the user, multimedia data, cryptographically hashed identity document images, and biometric modality data of the user. Identity documents include, but are not limited to, passports, driver's licenses, and identity cards.

It is contemplated by the present disclosure that multimedia data may include any type of content or data that may be accessed, for example, via the Internet. Multimedia data may include, but is not limited to, images, videos, and audio data. An image can be a digital picture taken, for example, with a camera or a smart device including a camera. Audio data can be, for example, an utterance spoken by a user or voice data extracted from a video. Videos may be, for example, movies, newscasts or podcasts.

Additionally, the memory 18 can be used to store any type of software 38. As used herein, the term "software" is intended to encompass an executable computer program that exists permanently or temporarily on any non-transitory computer-readable recordable medium that causes the electronic device 10 to perform at least a portion of the functions, methods, and/or algorithms described herein.

Application programs are software and include, but are not limited to, operating systems, Internet browser applications, enrolment applications, authentication applications, user liveness detection applications, trained machine learning models that facilitate determining whether artifacts detected in multimedia data indicate the use of artificial intelligence in generating the multimedia data, secure cryptographic algorithms, for example, SHA-256, machine learning algorithms (MLA), synthetic speech detection algorithms for enhancing detection of fraudulent voice audio data, face tracker applications, feature extraction computer programs, Natural Language Processing programs, Computer Vision programs, and any special computer program that manages the relationship between application software and any suitable variety of hardware that helps to make-up a computer system or computing environment. The software may also include computer programs that implement buffers and use RAM to store temporary data.

Authentication applications enable the electronic device 10 to conduct user verification and identification (1:N) transactions with any type of authentication data, where "N" is a number of candidates. Computer Vision software applications can, amongst other things, calculate the pixel screen coverage of objects in an image to facilitate detecting artifacts indicative of artificial intelligence generation.

Natural Language Processing (NLP) programs facilitate detecting text in images that may have been generated using artificial intelligence. NLP programs can analyze language patterns, grammar, and context to identify text generated using artificial intelligence.

A machine learning algorithm (MLA) may be trained to create a machine learning model for enhancing detection of multimedia data generated using artificial intelligence. Such machine learning algorithms include, but are not limited to, deep neural networks and statistical models. Machine learning models have parameters which are modified during training to optimize functionality of the models trained using a machine learning algorithm (MLA). Machine learning models have parameters which are modified during training to optimize functionality of the models trained using a machine learning algorithm (MLA). MLAs include at least classifiers and regressors. Example classifiers are Deep Neural Networks, Time Delay Neural Networks, Recurrent Neural Networks, Residual Networks, and Generative Adversarial Networks.

The process of verifying the identity of a user is known as a verification transaction. Typically, during a verification transaction a biometric template is generated from biometric modality data of a user captured during the transaction. The generated biometric template is compared against the corresponding record biometric template of the user and a matching score is calculated for the comparison. If the matching score meets or exceeds a threshold score, the identity of the user is verified as true. Alternatively, the captured user biometric modality data may be compared against the corresponding record biometric modality data to verify the identity of the user.

An authentication data requirement is the biometric modality data desired to be captured during a verification or identification transaction. For the example methods described herein, the authentication data requirement is for the face of the user. However, the authentication data requirement may alternatively be for any biometric modality or any combination of biometric modalities, for example, voice and voice and face.

Biometric modality data may be captured in any manner. For example, for voice biometric data the electronic device 10 may record a user speaking. For face biometric data, the camera 22 may record image data of the face of a user by taking one or more photographs or digital images of the user, or by taking a video of the user. The camera 22 may record a sequence of digital images at irregular or regular intervals. A video is an example of a sequence of digital images being captured at a regular interval. Captured biometric modality data may be temporarily or permanently stored in the electronic device 10 or in any device capable of communicating with the electronic device 10. Alternatively, the biometric modality data may not be stored.

When a sequence of digital images is captured, the electronic device 10 may extract images from the sequence and assign a time stamp to each extracted image. An application, for example a face tracker application may process the extracted digital images. The face tracker application may extract data from images including, but not limited to, facial landmarks, facial expressions, pixel density, orientation of the face within the image, color saturation, the spatial gap between a device that captured the image and the user, and ambient lighting conditions. The extracted data may be analyzed to determine whether the image includes artifacts indicating the use of artificial intelligence in generating the image.

The extracted data may be stored in the memory 18. The facial landmark data includes data generated by the face tracker application as a result of processing the frames. The generated data includes, but is not limited to, coordinate values for facial landmarks. The facial landmarks are identified by the face tracker application on the facial image included in each processed frame. The face tracker application calculates three-dimensional coordinate values for each facial landmark. The facial landmarks include, but are not limited to, cheek points, nose points, points on sides of the face, chin points, and points about the eyes and eyebrows. The facial landmark data may be used to monitor the position of each facial landmark between frames to assess the presence of unnatural movements or visual abnormalities in a video. Such unnatural movements or visual abnormalities may indicate the use of artificial intelligence in generating the video.

Feature extraction computer programs process audio signals to generate a representative feature vector that contains information about the signal. Audio signals can be voice data spoken by a user. Features may be extracted from voice data and analyzed using a trained machine learning model to determine whether the voice data includes artifacts indicating the use of artificial intelligence in generating the voice data.

The gyroscope 20 and the one or more accelerometers 22 generate data regarding rotation and translation of the electronic device 10 that may be communicated to the processor 16 and the memory 18 via the bus 24. The gyroscope 20 and accelerometer 22 are typically included in electronic devices 10 that are primarily mobile, for example, smart phones and other smart devices, but not in electronic devices 10 that are primarily stationary, for example, servers or personal computers. Thus, the electronic device 10 may alternatively not include the gyroscope 20 or the accelerometer 22 or may not include either.

The camera 26 captures image data. As used herein, capture means to record data temporarily or permanently, for example, multimedia data. The camera 26 can be one or more imaging devices configured to record images of identity documents of a user while utilizing the electronic device 10. Moreover, the camera 26 is capable of recording images under any lighting conditions including infrared light. The camera 26 may be integrated into the electronic device 10 as one or more front-facing cameras and/or one or more rear facing cameras that each incorporates a sensor, for example and without limitation, a CCD or CMOS sensor. Alternatively, the camera 26 can be external to the electronic device 10.

The user interface 28 and the display 30 allow interaction between a user and the electronic device 10. The display 30 may include a visual display or monitor that displays information. For example, the display 30 may be a Liquid Crystal Display (LCD), an active matrix display, plasma display, or cathode ray tube (CRT). The user interface 28 may include a keypad, a camera, a keyboard, a mouse, an illuminator, a signal emitter, at least one microphone, for example, dual microphones, and/or speakers.

The camera 26 can be considered a sensor in the electronic device 10. It is contemplated by the present disclosure that the electronic device 10 may include additional sensors (not shown) that may also capture data while the camera 26 captures image data. Such sensors include, but are not limited to, a sensor for detecting ambient light, a sensor for calculating global positioning coordinates (GPS) of the electronic device 10, and one or more magnetometers. For embodiments in which the camera 26 is external to the electronic device 10, such additional sensors may be included in the camera 26. Moreover, such an external camera 26 may include at least one microphone, speakers, accelerometers, and gyroscopes.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 28 communicates this change to the processor 16 and settings can be changed or user entered information can be captured and stored in the memory 18.

The sensing device 32 may include Radio Frequency Identification (RFID) components or systems for receiving information from other devices (not shown) and for transmitting information to other devices. The sensing device 32 may alternatively, or additionally, include components with Bluetooth, Near Field Communication (NFC), infrared, or other similar capabilities. Communications between the electronic device 10 and other devices (not shown) may occur via NFC, RFID, Bluetooth or the like only so a network connection from the electronic device 10 is unnecessary.

The communications interface 34 may include various network cards, and circuitry implemented in software and/or hardware to enable wired and/or wireless communications with other devices (not shown). Communications include, for example, conducting cellular telephone calls and accessing the Internet over a network. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet™ or an Asynchronous Transfer Model (ATM) network) to provide a data communication connection to a compatible LAN. As yet another example, the communications interface 34 may be a wire or a cable connecting the electronic device 10 with a LAN, or with accessories such as, but not limited to, other electronic devices. Further, the communications interface 34 may include peripheral interface devices, such as a Universal Serial Bus (USB) interface, a PCMCIA (Personal Computer Memory Card International Association) interface, and the like.

The communications interface 34 also allows the exchange of information across a network between the electronic device 10 and any other device (not shown). The exchange of information may involve the transmission of radio frequency (RF) signals through an antenna (not shown).

The server 12 includes most of the same components as described herein with regard to the electronic device 10. However, because the server 12 is primarily stationary, not primarily mobile, the server 12 may not include the gyroscope 20 and/or the accelerometer 22.

Artificial intelligence (AI) may be used to create fake copies of multimedia data. Current AI techniques are not capable of creating a perfect fake copy of an image so images generated using artificial intelligence typically include artifacts that indicate the image may have been generated using AI. Artifacts are typically subtle imperfections or irregularities in multimedia data that cannot be readily detected. For images, analyzing pixels facilitates detecting artifacts that may indicate the image was generated using AI.

Figure 3:
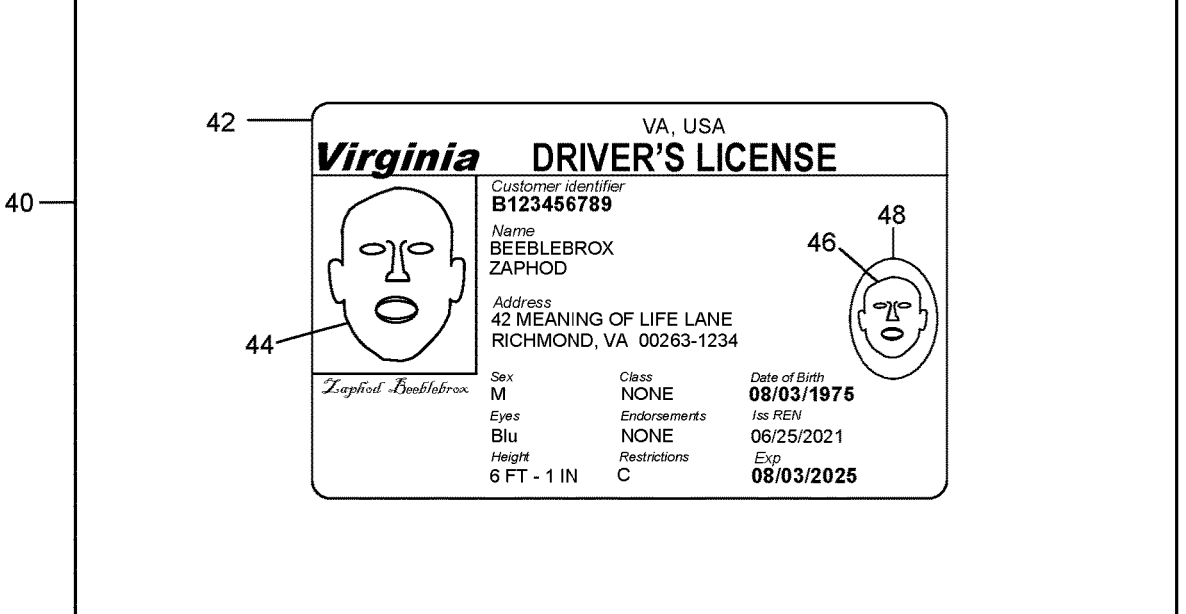
FIG. 3 is a diagram illustrating an image including an example identity document generated using artificial intelligence.

FIG. 3 is a diagram illustrating an image 40 including an example identity document 42 generated using AI. The example identity document 42 is a driver's license. However, the identity document 42 may alternatively be any identity document used by a person to prove a claim of identity, for example, a passport or an identification card.

The identity document 42 includes a first image 44 and a second image 46 of the person to whom the identity document was issued. The second image 46 may be a smaller version of the first image 44. The second image 46 is positioned in an oval 48 on an opposite side of the identity document 40 than the first image 44. However, by analyzing the pixels in the image 40, it can be determined that the second image 46 does not include a left nostril. Omitting the left nostril is an example of an artifact that may indicate the image 40 was generated using AI. Although the artifact described herein is omits a nostril, it is contemplated by the present disclosure that any other type of subtle imperfection or irregularity may qualify as an artifact, for example, omitting an ear lobe, misshaping a chin, or positioning eyes too close together. Frames of videos may be similarly analyzed for artifacts in any of the images in any of the frames of the video.

Artificial intelligence (AI) may also be used to create fake or cloned copies of audio data using, for example, voice conversion models. Voice conversion models manipulate audio data spoken by one person to sound like audio data spoken by a different person. Additionally, a machine learning model may be trained to generate synthetic audio data that mimics voice data of a certain person. Each of these AI techniques leaves artifacts in the generated audio data that can be detected using, for example, synthetic speech detection models.

Service providers typically require individuals to upload an image of his or her identity document 42 and a claim of identity to facilitate authentication. The uploaded images are typically analyzed to determine whether the identity document in the uploaded image is authentic, jurisdictionally accurate, and unexpired.

Fraudulent identity documents may be created by weaving together real and fake identity document elements. Images of fraudulent identity documents can be uploaded, for example, when remotely attempting to open a bank account. Such impersonations are known as spoofing. These fraudulent identity documents may be of such high quality that it is almost impossible to distinguish them from genuine identity documents using known techniques. As a result, if not detected such fraudulent identity documents may be used, for example, to steal money from bank and stock accounts, steal healthcare records, and facilitate insurance fraud. Thus, these fraudulent identity documents pose a significant risk to network-based transactions conducted between individuals and, for example, banks, insurance companies, healthcare companies, and fintech companies.

To address these problems the electronic device 10 while being operated by a user may receive multimedia data. The multimedia data can include an image, more than one image and/or voice data. A trained machine learning model can be used to analyze the one or more images for artifacts indicating the use of artificial intelligence in generating the images. Moreover, a synthetic speech detection algorithm can be used to determine whether the voice data includes artifacts indicating the use of artificial intelligence in generating the voice data. In response to determining the one or more images includes at least one artifact or the voice data includes at least one artifact, the multimedia data can be categorized as fraudulent and originating from artificial intelligence generation.

Figure 4:
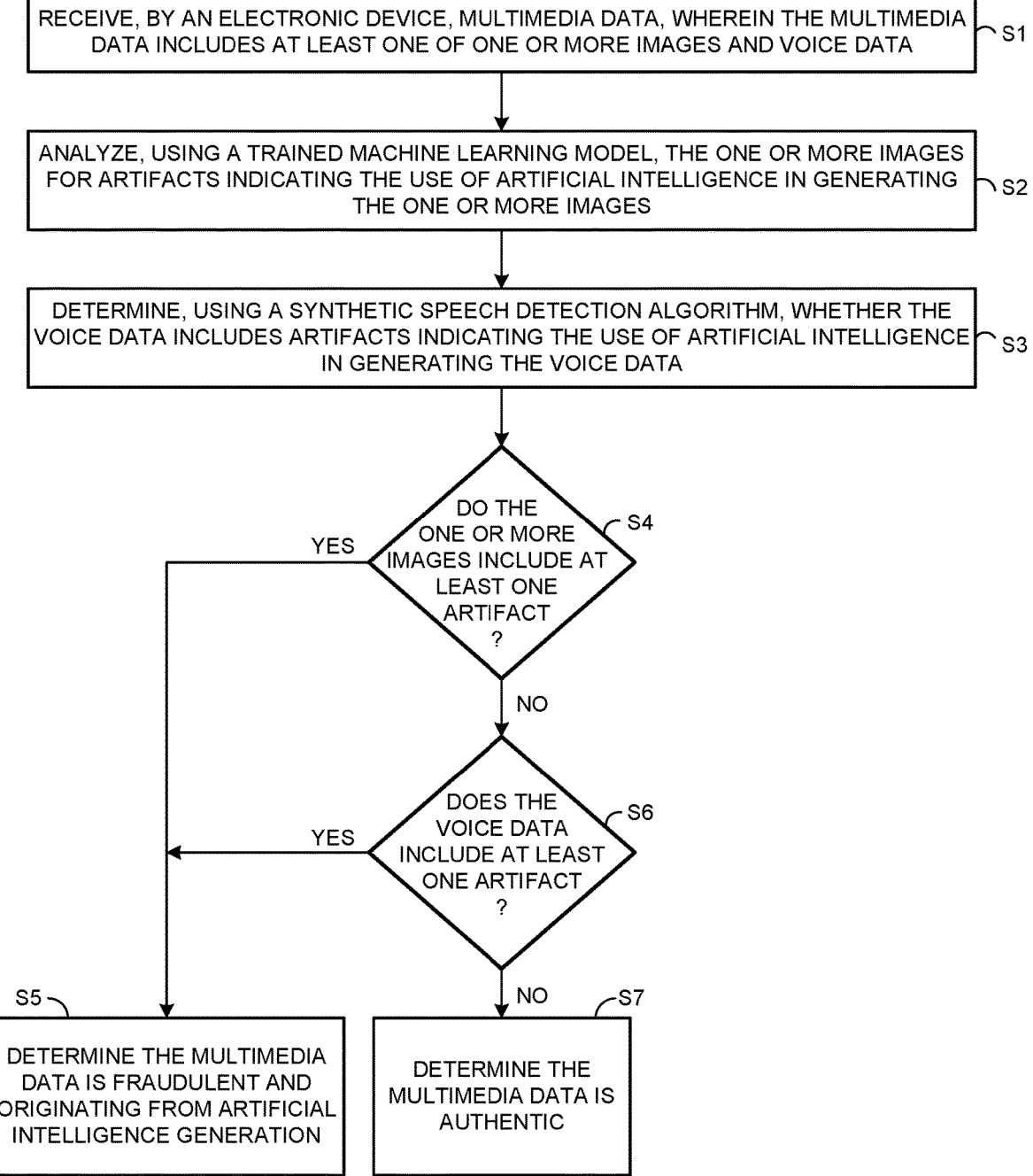
FIG. 4 is a diagram illustrating an example method and algorithm for enhancing detection of multimedia data generated using artificial intelligence according to an embodiment of the present disclosure.

FIG. 4 is a diagram illustrating an example method and algorithm for enhancing detection of multimedia data generated using artificial intelligence according to an embodiment of the present disclosure. A user may be required to prove he or she is live and to authenticate his or her identity before being permitted to conduct, using the electronic device 12, a desired network-based transaction. Such network-based transactions include, but are not limited to, buying merchandise from a merchant service provider website, accessing top secret information from a computer system, or opening an account at a financial institution. Detecting fraudulent multimedia data like identity credentials generated using artificial intelligence would facilitate reducing fraud. Users may encounter multimedia data via the Internet by reading news, listening to podcasts, and watching videos without knowing if the multimedia content is genuine or has been generated using artificial intelligence. FIG. 4 illustrates example steps performed when the electronic device 10 runs software 38 stored in the memory 18 to enhance detection of multimedia data generated using artificial intelligence.

In step S1, the software 38 executed by the processor 16 causes the electronic device 10 to receive multimedia data while being operated by a user. The multimedia data includes one or more images and/or voice data viewed and/or heard by the user while operating the electronic device 10. In step S2, the software 38 executed by the processor 16 causes the electronic device 10 to analyze, using a trained machine learning model, the one or more images for artifacts indicating the use of artificial intelligence in generating the one or more images. Next, in step S3, the software 38 executed by the processor 16 causes the electronic device 10 to determine, using a synthetic speech detection algorithm, whether the voice data includes artifacts indicating the use of artificial intelligence in generating the voice data.

In step S4, the software 38 executed by the processor 16 causes the electronic device 10 to determine whether the one or more images include at least one artifact. If yes, in step S5, the software 38 executed by the processor 16 causes the electronic device 10 to determine the multimedia data is fraudulent and originating from artificial intelligence generation. The electronic device 10 may display a message indicating the multimedia data is fraudulent. The message may also prompt the user to cease viewing the multimedia data.

However, when the one or more images are devoid of artifacts, in step S6, the software 38 executed by the processor 16 causes the electronic device 10 to determine whether the voice data includes at least one artifact. If yes, in step S5, the software 38 executed by the processor 16 causes the electronic device 10 to determine the multimedia data is fraudulent and originating from artificial intelligence generation. The electronic device 10 may display a message indicating the multimedia data is fraudulent. The message may also prompt the user to cease viewing the multimedia data.

When the one or more images are devoid of artifacts, in step S7, the software 38 executed by the processor 16 causes the electronic device 10 to characterize the multimedia data as authentic.

Although the example method and algorithm described herein determine multimedia data to be fraudulent when at least one or more artifact is detected in an image or in the voice data, it is contemplated by the present disclosure that multimedia data may alternatively, or additionally, be determined to be fraudulent using, for example, confidence scores and threshold values. More specifically, the trained machine learning model may generate a confidence score regarding the likelihood that the one or more images were generated using artificial intelligence. Similarly, the synthetic speech detection algorithm may generate a confidence score regarding the likelihood that the voice data was generated using artificial intelligence. Each confidence score may be compared against a threshold value. When each confidence score satisfies the threshold value the received multimedia data may be determined to be authentic. However, when either confidence score fails to satisfy the threshold value, the received multimedia data may be determined to be fraudulent and originating from artificial intelligence generation.

Each confidence score may satisfy the threshold value when the respective confidence score is equal to or greater than the threshold value, greater than the threshold value, less than the threshold value, or less than or equal to the threshold value depending on the design of the algorithm. The threshold value may alternatively include multiple threshold values, each of which is required to be satisfied by a respective confidence score to satisfy the threshold value.

Instead of using confidence scores and threshold values to facilitate detecting fraudulent multimedia data generated by artificial intelligence, cryptographic hashes may alternatively be used. For example, a cryptographic hash can be calculated for each frame in the video based on the image in the respective frame and can be compared against a corresponding record cryptographic hash of the user. Similarly, a cryptographic hash can be calculated for each frame based on the audio data in each frame and can be compared against a corresponding record cryptographic hash of the user.

If all the hashes match, the software 38 executed by the processor 16 could cause the electronic device 10 to determine the multimedia data is authentic. However, if one or more of the hashes fails to match, the software 38 executed by the processor 16 could cause the electronic device 10 to determine the multimedia data is fraudulent and originating from artificial intelligence generation.

In the example methods and algorithms described herein, in step S5, a message is displayed by the electronic device 10 when the multimedia data is determined to be fraudulent. However, it is contemplated by the present disclosure that when confidence scores are used as the basis for determining whether multimedia data was generated using artificial intelligence dynamic threat response measures may alternatively, or additionally, be implemented by the electronic device 10. The dynamic threat responses may be determined based on the severity and context of the artificial intelligence generation as determined from the confidence score-threshold value comparisons.

Dynamic threat responses include, but are not limited to, issuing an alert, restricting access while navigating websites on which the user desires to conduct a network-based transaction, and filtering content a user may view on websites. Issuing alerts includes, but is not limited to, displaying a message, emitting a noise, speaking a warning, vibrating or any combination thereof.

It is contemplated by the present disclosure that, for example, in step S1, the methods and algorithms described herein may additionally evaluate the received multimedia data to verify the multimedia data was taken of a live person. Behavioral biometrics of the user shown in the received multimedia data may also be analyzed for anomalies indicative of cyber-attacks generated by artificial intelligence. Behavioral biometrics include interactions with the electronic device 10- and user movements associated with the use of devices operatively connected to the electronic device 10. Specific behavioral biometrics can include, but are not limited to, user typing patterns, user mouse movements, and user touchscreen interactions. When multimedia data does not include an image of a live person or does not pass the behavioral biometric analysis, the electronic device 10 may require additional authentication challenges before the user is permitted to conduct a desired transaction.

The information shown in FIG. 5 includes some of the same information shown in FIG. 4 as described in more detail below. As such, features illustrated in FIG. 5 that are identical to features illustrated in FIG. 4 are identified using the same reference numerals used in FIG. 4.

Figure 5:
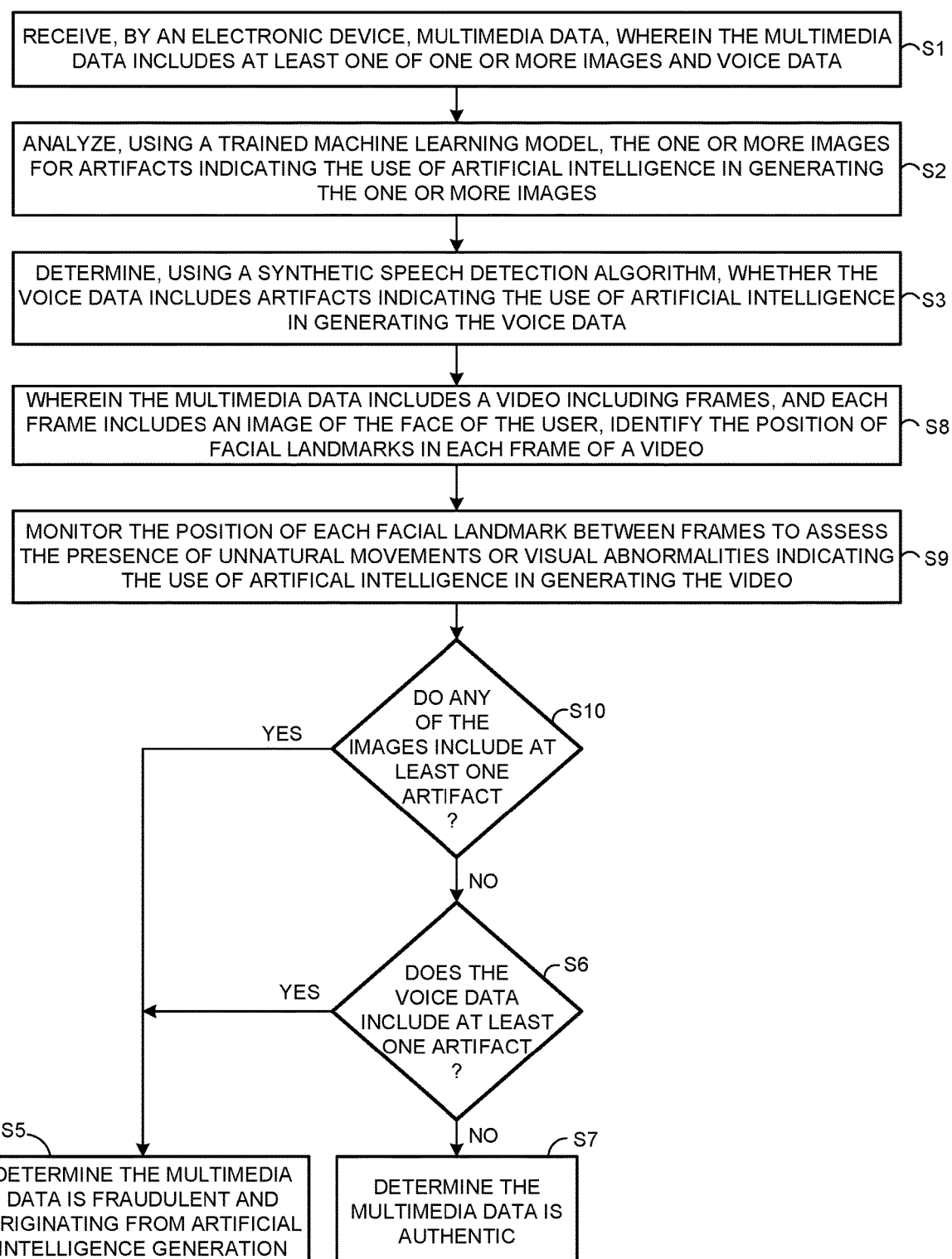
FIG. 5 is a diagram illustrating an example method and algorithm for enhancing detection of multimedia data generated using artificial intelligence according to another embodiment of the present disclosure.

FIG. 5 is a diagram illustrating an example method and algorithm for enhancing detection of multimedia data generated using artificial intelligence according to another embodiment of the present disclosure. The multimedia data is a video. The video may be recorded or may be live streamed via, for example, the Internet. The images are facial images of the user extracted from frames in the video and the voice data is extracted from the video. FIG. 5 illustrates example steps performed when the electronic device 10 runs software 38 stored in the memory 18 to enhance detection of multimedia data generated using artificial intelligence.

This method and algorithm are similar to that shown in FIG. 4. However, in step S3, in addition to determining whether the voice data includes artifacts the electronic device 10 may assess the authenticity and content of the video using, for example, computer vision programs and machine learning models. Doing so may facilitate detecting video generated using artificial intelligence, tampering of the video, and/or content that violates policies.

Next, in step S8, the software 38 executed by the processor 16 causes the electronic device 10 to identify the position of facial landmarks in each frame of the video. The facial landmarks include, but are not limited to, cheek points, nose points, points on sides of the face, chin points, and points about the eyes and eyebrows. In step S9, the software 38 executed by the processor 16 causes the electronic device 10 to monitor the position of each facial landmark between frames to assess the presence of unnatural movements or visual abnormalities indicating the use of artificial intelligence in generating the video. As described herein, unnatural movements and visual abnormalities are artifacts for each image involved in detecting the unnatural movement or visual abnormality.

Unnatural movement can be any type of movement between frames that typically does not occur in nature. For example, when a facial landmark is the tip of the nose, the tip of the nose may be properly positioned in one frame but may be positioned above the left eye in the next frame. Such a movement between frames should be considered unnatural because it does not occur in nature. A visual abnormality may be, for example, when the tip of the nose is above the left eye in an image.

Next, in step S10, the software 38 executed by the processor 16 causes the electronic device 10 to determine whether any of the images includes at least one artifact, including unnatural movements or visual abnormalities. If yes, in step S5, the software 38 executed by the processor 16 causes the electronic device 10 to determine the multimedia data is fraudulent and originating from artificial intelligence generation. The electronic device 10 may display a message that indicates the multimedia data is fraudulent. The message may also prompt the user to cease viewing the multimedia data.

When the one or more images are devoid of artifacts, in step S6, the software 38 executed by the processor 16 causes the electronic device 10 to determine whether the voice data includes at least one artifact. If yes, in step S5, the software 38 executed by the processor 16 causes the electronic device 10 to determine the multimedia data is fraudulent and originating from artificial intelligence generation. The electronic device 10 may display a message that indicates the multimedia data is fraudulent. The message may also prompt the user to cease viewing the multimedia data.

When the voice data is devoid of artifacts, then in step S7, the software 38 executed by the processor 16 causes the electronic device 10 to determine the multimedia data is authentic.

The information shown in FIG. 6 includes some of the same information shown in FIG. 4 as described in more detail below. As such, features illustrated in FIG. 6 that are identical to features illustrated in FIG. 4 are identified using the same reference numerals used in FIG. 4.

Figure 6:
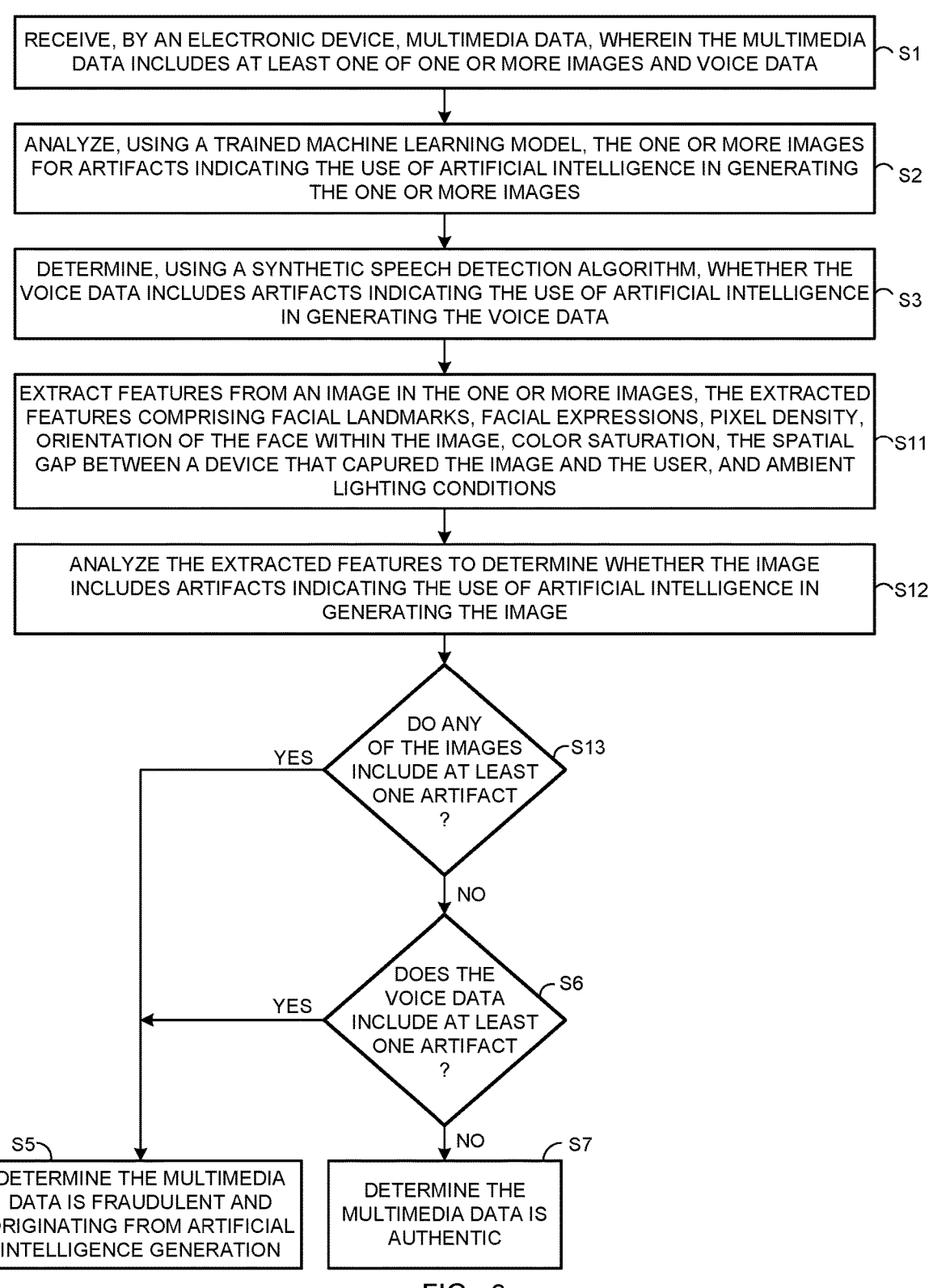
FIG. 6 is a diagram illustrating an example method and algorithm for enhancing detection of multimedia data generated using artificial intelligence according to yet another embodiment of the present disclosure.

FIG. 6 is a diagram illustrating an example method and algorithm for enhancing detection of multimedia data generated using artificial intelligence according to yet another embodiment of the present disclosure. FIG. 5 illustrates example steps performed when the electronic device 10 runs software 38 stored in the memory 18 to enhance detection of multimedia data generated using artificial intelligence.

This method and algorithm are similar to that shown in FIG. 4. However, after determining, in step S3, whether the voice data includes artifacts, in step S11, the software 38 executed by the processor 16 causes the electronic device 10 to extract features from an image in the one or more images. The extracted features include, but are not limited to, facial landmarks, facial expressions, pixel density, orientation of the face within the image, color saturation, the spatial gap between a device that captured the image and the user, and ambient lighting conditions.

Next, in step S12, the software 38 executed by the processor 16 causes the electronic device 10 to analyze the extracted features to determine whether the image includes artifacts indicating the use of artificial intelligence in generating the image. In step S13, the software 38 executed by the processor 16 causes the electronic device 10 to determine whether any of the images include at least one artifact. If yes, in step S5, the software 38 executed by the processor 16 causes the electronic device 10 to determine the multimedia data is fraudulent and originating from artificial intelligence generation. The electronic device 10 may display a message indicating the multimedia data is fraudulent. The message may also prompt the user to cease viewing the multimedia data.

However, when the images are devoid of artifacts, in step S6, the software 38 executed by the processor 16 causes the electronic device 10 to determine whether the voice data includes at least one artifact. If yes, in step S5, the software 38 executed by the processor 16 causes the electronic device 10 to determine the multimedia data is fraudulent and originating from artificial intelligence generation. The electronic device 10 may display a message indicating the multimedia data is fraudulent. The message may also prompt the user to cease viewing the multimedia data.

When voice data is devoid of artifacts, in step S7, the software 38 executed by the processor 16 causes the electronic device 10 to determine the multimedia data is authentic.

Although the example methods and algorithms are described herein as being conducted by the electronic device 10, it is contemplated by the present disclosure that the server 12 may alternatively conduct the example methods and algorithms. For example, the electronic device 10 may capture the multimedia data and transmit the captured multimedia data to the server 12 via the network 14. The software executed by a processor in the server 12 could cause the server 12, in step S1, to receive the multimedia data and to conduct the operations described in steps S2 to S13.

Additionally, it is contemplated by the present disclosure that blockchain technology may be used to create a tamper proof ledger of all transactions conducted for received multimedia data and multimedia data determined to be fraudulent as originating from artificial intelligence generation. Authorized individuals may be granted access to the ledger to, for example, conduct audits, verify compliance, and conduct forensic analysis.

Using the methods and algorithms for enhancing detection of multimedia data generated using artificial intelligence as described herein enables quickly determining whether multimedia data may be fraudulent. As a result, the methods and algorithms facilitate enhancing a reduction in risks associated with conducting different kinds of network-based transactions while enhancing security against spoofing attacks and facilitating a reduction in costs incurred due to successful spoofing attacks.

It is contemplated by the present disclosure that the example methods and algorithms described herein may be implemented as one or more machine learning models that may be periodically retrained with data regarding new artificial intelligence techniques. Doing so facilitates adapting the example methods and algorithms described herein to evolving artificial intelligence techniques which further facilitates the reduction of risks associated with conducting network-based transactions. The machine learning models may be retrained after any period of time, for example, every three to six-months. It should be understood that the dynamic threat responses may evolve over time as the machine learning models are retrained.

It is contemplated by the present disclosure that the example methods and algorithms described herein may be conducted entirely by the electronic device 10; partly by the electronic device 10 and partly by the server 12; entirely by the server 12, or by any other combination of other servers (not shown), electronic devices (not shown), or computers (not shown) operable to communicate with the electronic device 10 and the server 12 via the network 14. Furthermore, data described herein as being stored in the electronic device 10 may alternatively, or additionally, be stored in the server 12 or any other server (not shown), electronic device (not shown), or computer (not shown) operable to communicate with the electronic device 10 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for enhancing detection of multimedia data generated using artificial intelligence comprising the steps of:

receiving, by an electronic device operated by a user, multimedia data, the multimedia data being a video including frames that each include a facial image of the user and voice data of the user;

identifying the position of facial landmarks in each image, wherein facial landmarks include cheek points, nose points, chin points, points on the side of the face of the user, and points about the eyes and eyebrows;

monitoring the position of each facial landmark between images to assess the presence of unnatural movements or visual abnormalities indicating the use of artificial intelligence in generating the video;

extracting features from one of the images included in the video, the extracted features comprising facial expressions, pixel density, orientation of the face within the image, color saturation, a spatial gap between a device that captured the image and the user, and ambient lighting conditions;

analyzing the extracted features to determine whether the one image includes artifacts indicating the use of artificial intelligence in generating the image;

determining, using a synthetic speech detection algorithm, whether the voice data includes artifacts indicating the use of artificial intelligence in generating the voice data; and in response to determining one or more of the images includes at least one artifact or the voice data includes at least one artifact, determining the multimedia data is fraudulent and originating from artificial intelligence generation.

2. The method according to claim 1, further comprising displaying a message that indicates the multimedia data is fraudulent and prompts the user to cease viewing the multimedia data.

3. The method according to claim 1, further comprising determining the multimedia data is authentic in response to determining one or more of the images and the voice data are devoid of artifacts.

4. The method according to claim 1, said determining step comprising:

extracting features from the voice data; and analyzing the extracted features using the synthetic speech detection algorithm to determine whether the voice data includes artifacts indicating the use of artificial intelligence in generating the voice data.

5. The method according to claim 1 further comprising analyzing behavioral biometrics of the user to detect anomalies indicative of cyber-attacks generated by artificial intelligence, wherein the behavioral biometrics include interactions with the electronic device and user movements associated with the use of devices operatively connected to the electronic device.

6. The method according to claim 5, wherein the devices operatively connected to the electronic device comprise a keyboard and a mouse.

7. The method according to claim 1 further comprising assessing linguistic patterns and audio anomalies in the voice data.

8. The method according to claim 1, said method further comprising:

generating a cryptographic hash for each frame of the video based on the image in the respective frame; and generating a cryptographic hash for each frame of the video based on the audio data in the respective frame.

9. An electronic device for enhancing detection of multimedia data generated using artificial intelligence comprising:

a processor; and a memory configured to store data, said electronic device being associated with a network and said memory being in communication with said processor and having instructions stored thereon which, when read and executed by said processor, cause said electronic device to:

receive multimedia data, the multimedia data being a video including frames that each include a facial image of the user and voice data of the user;

identify the position of facial landmarks in each image, wherein facial landmarks include cheek points, nose points, chin points, points on the side of the face of the user, and points about the eyes and eyebrows;

monitor the position of each facial landmark between images to assess the presence of unnatural movements or visual abnormalities indicating the use of artificial intelligence in generating the video;

extract features from one of the images in the video, the extracted features comprising facial expressions, pixel density, orientation of the face within the image, color saturation, a spatial gap between a device that captured the image and the user, and ambient lighting conditions;

analyze the extracted features to determine whether the one image includes artifacts indicating the use of artificial intelligence in generating the image;

determine, using a synthetic speech detection algorithm, whether the voice data includes artifacts indicating the use of artificial intelligence in generating the voice data; and in response to determining one or more of the images includes at least one artifact or the voice data includes at least one artifact, determine the multimedia data is fraudulent and originating from artificial intelligence generation.

10. The electronic device according to claim 9, wherein the instructions when read and executed by said processor, further cause said electronic device to display a message that indicates the multimedia data is fraudulent and prompts the user to cease viewing the multimedia data.

11. The electronic device according to claim 9, wherein the instructions when read and executed by said processor, further cause said electronic device to determine the multimedia data is authentic in response to determining one or more images and the voice data are devoid of artifacts.

12. The electronic device according to claim 9, wherein the instructions when read and executed by said processor, further cause said electronic device to:

extract features from the voice data; and analyze the extracted features using the synthetic speech detection algorithm to determine whether the voice data includes artifacts indicating the use of artificial intelligence in generating the voice data.

13. The electronic device according to claim 9, wherein the instructions when read and executed by said processor, further cause said electronic device to analyze behavioral biometrics of the user to detect anomalies indicative of cyber-attacks generated by artificial intelligence, wherein the behavioral biometrics include interactions with said electronic device and user movements associated with the use of devices operatively connected to said electronic device.

14. The method according to claim 13, wherein the devices operatively connected to said electronic device comprise a keyboard and a mouse.

15. The electronic device according to claim 9, wherein the instructions when read and executed by said processor, further cause said electronic device to assess linguistic patterns and audio anomalies in the voice data.

16. The electronic device according to claim 9, wherein the instructions when read and executed by said processor, further cause said electronic device to:

generate a cryptographic hash for each frame of the video based on the image in the respective frame; and generate a cryptographic hash for each frame of the video based on the audio data in the respective frame.

* * * * *